United States Patent
Yoshii et al.

(10) Patent No.: US 8,951,932 B2
(45) Date of Patent: Feb. 10, 2015

(54) PEROVSKITE CATALYST AND METHOD OF MANUFACTURING THE SAME

(75) Inventors: Takeshi Yoshii, Nisshin (JP); Tomohiko Nakanishi, Kariya (JP)

(73) Assignee: Denso Corporation, Kariya (JP)

( * ) Notice: Subject to any disclaimer, the term of this patent is extended or adjusted under 35 U.S.C. 154(b) by 503 days.

(21) Appl. No.: 13/299,833

(22) Filed: Nov. 18, 2011

(65) Prior Publication Data
US 2012/0129689 A1    May 24, 2012

(30) Foreign Application Priority Data
Nov. 22, 2010 (JP) .................................. 2010-259670

(51) Int. Cl.
| | |
|---|---|
| *B01J 21/00* | (2006.01) |
| *B01J 23/00* | (2006.01) |
| *B01J 25/00* | (2006.01) |
| *B01J 29/00* | (2006.01) |
| *B01J 23/10* | (2006.01) |
| *C01B 13/18* | (2006.01) |

(Continued)

(52) U.S. Cl.
CPC .............. *C01B 13/185* (2013.01); *C01B 13/14* (2013.01); *C01G 45/1264* (2013.01); *C01G 49/0054* (2013.01); *C01G 51/68* (2013.01); *B01J 37/24* (2013.01); *B01J 23/8892* (2013.01); *B01J 23/002* (2013.01); *B01J 23/83* (2013.01); *B01J 35/1009* (2013.01); *B01J 35/1014* (2013.01); *B01J 35/1038* (2013.01); *C01P 2002/72* (2013.01); *C01P 2006/12* (2013.01); *C01P 2006/14* (2013.01); *C01P 2002/34* (2013.01); *B01J 37/22* (2013.01)
USPC ........................... 502/303; 502/100; 502/300

(58) Field of Classification Search
USPC ......................................... 502/303, 100, 300
See application file for complete search history.

(56) References Cited

U.S. PATENT DOCUMENTS

| | | | |
|---|---|---|---|
| 5,747,184 A * | 5/1998 | Kurbjuhn et al. ............. | 429/509 |
| 5,804,526 A | 9/1998 | Satoh et al. | |

(Continued)

FOREIGN PATENT DOCUMENTS

| | | |
|---|---|---|
| JP | 9-267040 | 10/1997 |
| JP | 2002-321923 | 11/2002 |

(Continued)

OTHER PUBLICATIONS

Japanese Office Action dated Oct. 23, 2012, issued in corresponding Japanese Application No. 2010-259670, with English translation.

*Primary Examiner* — James McDonough
(74) *Attorney, Agent, or Firm* — Nixon & Vanderhye P.C.

(57) ABSTRACT

A method of manufacturing a perovskite catalyst composed of perovskite oxide includes mixing step, firing step and acid-treating step. In the mixing step, an A-site material and a B-site material are mixed at a stoichiometric ratio such that the A-site is increased, compared to that of a theoretical composition $ABO_3$ of perovskite oxide in which a ratio of A-site and B-site is 1:1. In the firing step, the obtained mixed powder is fired. In the acid-treating step, the obtained fired powder is acid-treated with acid of pH 2 or more and less than pH 7.

6 Claims, 2 Drawing Sheets

(51) Int. Cl.
    *C01B 13/14*     (2006.01)
    *C01G 45/12*     (2006.01)
    *C01G 49/00*     (2006.01)
    *C01G 51/00*     (2006.01)
    *B01J 37/24*     (2006.01)
    *B01J 23/889*     (2006.01)
    *B01J 23/83*     (2006.01)
    *B01J 35/10*     (2006.01)
    *B01J 37/22*     (2006.01)

(56) References Cited

U.S. PATENT DOCUMENTS

2002/0114752 A1     8/2002   Labhasetwar et al.
2004/0005483 A1*   1/2004   Lin ............................ 428/702

FOREIGN PATENT DOCUMENTS

| JP | 2003-181296 | 7/2003 |
| JP | 2003-260356 | 9/2003 |
| JP | P2006-175304 A | 7/2006 |

* cited by examiner

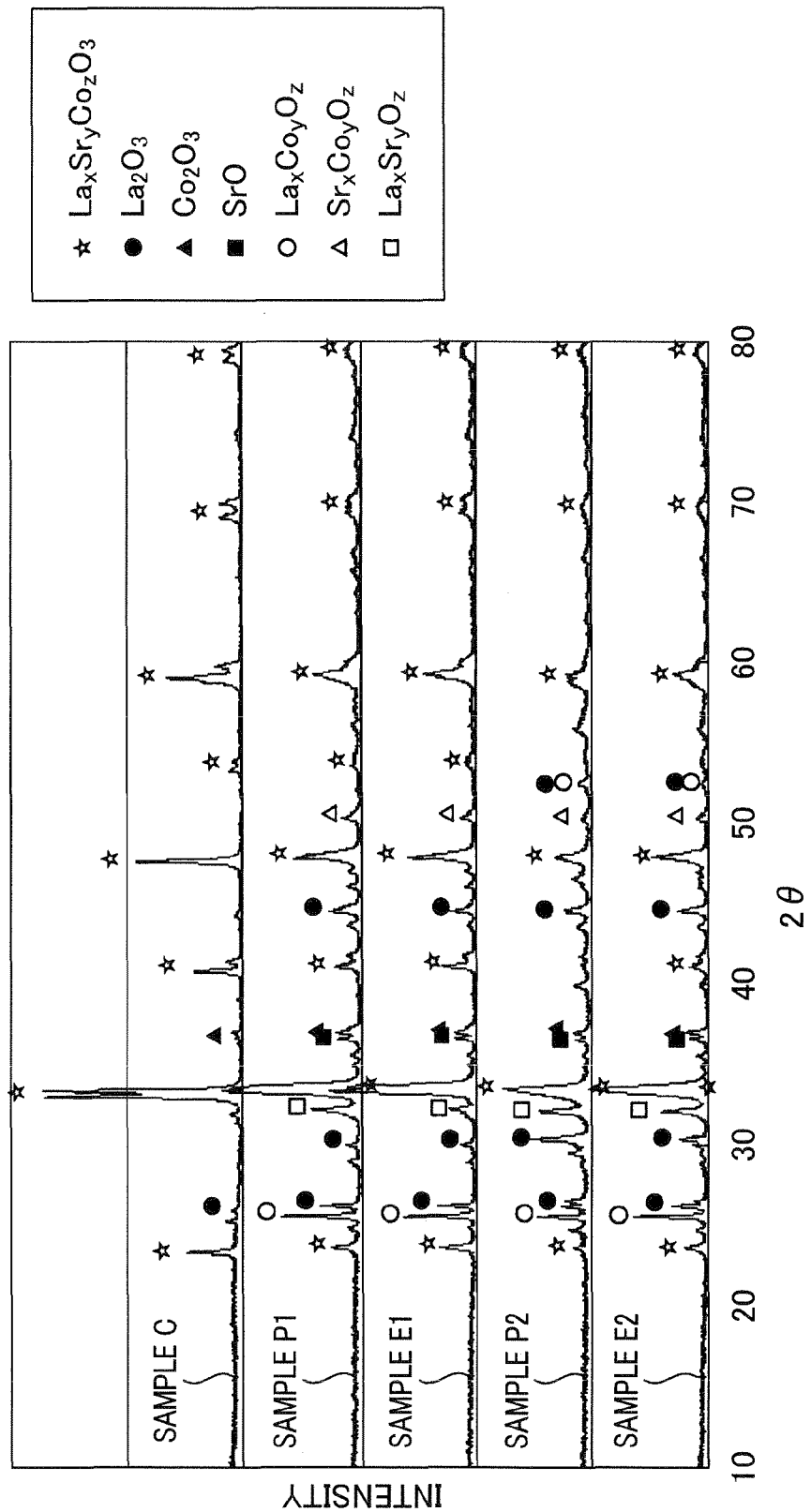

PEROVSKITE CATALYST AND METHOD OF MANUFACTURING THE SAME

CROSS REFERENCE TO RELATED APPLICATION

This application is based upon and claims the benefit of priority from the prior Japanese Patent Application No. 2010-259670, filed Nov. 22, 2010, the entire contents of which is incorporated herein by reference.

BACKGROUND OF THE INVENTION

1. Field of the Invention

The present invention relates to a perovskite catalyst composed of perovskite oxide that is used as an exhaust gas purifying catalyst, a photocatalyst, or other types of catalyst, and a method of manufacturing the perovskite catalyst.

2. Description of the Related Art

The perovskite catalyst is used as an exhaust gas purifying catalyst that purifies exhaust gas of a diesel engine, a photocatalyst that decomposes water into hydrogen and oxygen using optical energy, and the like. In general, the perovskite catalyst is composed of perovskite oxide represented by the general equation $ABO_3$. For example, a perovskite catalyst is known that contains a rare earth element such as La or an alkaline earth element such as Sr at the A-site and contains various transition elements at the B-site.

The perovskite oxide is obtained by an A-site material and a B-site material being mixed and fired. The A-site material includes an element composing the A-site and the B-site material includes an element composing the B-site.

In recent years, it has been required to develop a perovskite catalyst having higher activity. Therefore, studies are being conducted regarding atomizing perovskite oxide, increasing specific surface area, and the like.

For example, JP-A-2002-321923 discloses a method of manufacturing perovskite represented by $LaRuO_3$. Here, perovskite oxide that has been fired is ground and atomized.

JP-A-2003-260356 discloses an H-type layer perovskite photocatalyst that uses a compound having an Aurivillius structure having a structure similar to ion-exchanging layered perovskite. The compound is acid-treated and adjusted. Here, various kinds of cations can be present at the B-site of the perovskite oxide expressed by the general formula $ABO_3$.

JP-A-H9-267040 discloses an exhaust gas purifying catalyst composed of perovskite oxide that burns soot within the exhaust gas at a low temperature. According to the disclosure, synthesis conditions are adjusted, thereby obtaining perovskite oxide that is expressed by a formula $A_xA'_{1-x}B_yB'_{1-y}O_3$ (where, A is La; A' is at least one selected from Sr and Ca; B is at least one selected from Fe and Y; B' is at least one selected from Fe, Zn, and Mg; $0.5<x\leq1$ and $0.5<y\leq1.0$).

However, in the method in which the perovskite oxide catalyst powder is ground after firing, the perovskite structure may be destroyed by grinding and catalytic activity may decrease.

In addition, in the method in which acid treatment is performed on the perovskite oxide, the catalytic structure may be destroyed and catalytic activity may decrease.

Moreover, in the method in which the synthesizing conditions are adjusted and the perovskite oxide expressed by the formula $A_xA'_{1-x}B_yB'_{1-y}O_3$ is obtained, although the specific surface area of the catalyst itself increases, catalytic sites may decrease when the catalyst is, for example, carried by a carrier.

SUMMARY

It is desired to provide a perovskite catalyst having excellent catalytic activity as a result of increase in specific surface area and pore volume, and a method of manufacturing the perovskite catalyst.

A first aspect of the disclosure is a method of manufacturing a perovskite catalyst composed of perovskite oxide. The method includes the steps of: mixing an A-site material and a B-site material at a stoichiometric ratio such that the A-site is increased, compared to that of a theoretical composition $ABO_3$ of perovskite oxide in which a ratio of A-site and B-site is 1:1; firing the obtained mixed powder; and acid-treating the obtained fired powder with acid of pH 2 or more and less than pH 7.

The perovskite catalyst is obtained by the above-described mixing, firing, and acid-treating being performed.

In the mixing, a mixed powder is obtained by an A-site material and a B-site material being mixed at a stoichiometric ratio such that the A-site becomes greater than the B-site, compared to that of a theoretical composition $ABO_3$. As a result, perovskite oxide can be formed by the firing. In addition, the A-site material that has been excessively added becomes an unreacted component of the perovskite oxide, thereby forming a heterogenous phase containing unreacted components in the grain boundaries of the perovskite oxide. In other words, the heterogenous phase containing unreacted components can be actively formed by the mixing and the firing.

Then, when the acid-treating is performed, the heterogenous phase containing unreacted components is removed, and pores are formed in the area of removal. Therefore, the perovskite oxide can be made porous. As a result, a perovskite catalyst having a large specific surface area and a large pore volume can be obtained. Thus, the number of catalytic sites per unit weight of the perovskite catalyst can be increased, and excellent catalytic activity can be achieved.

A second aspect of the disclosure is a perovskite catalyst obtained by the method of manufacturing according to the first aspect.

A perovskite catalyst having a large specific surface area, a large pore volume, and excellent catalytic activity can be provided.

BRIEF DESCRIPTION OF THE DRAWINGS

The invention will be more particularly described with reference to the accompanying drawings in which:

FIG. 1 is an explanatory diagram of X-ray diffraction patterns of a perovskite catalyst of each sample in a first example;

DETAILED DESCRIPTION OF THE PREFERRED EMBODIMENTS

Figure 2A:
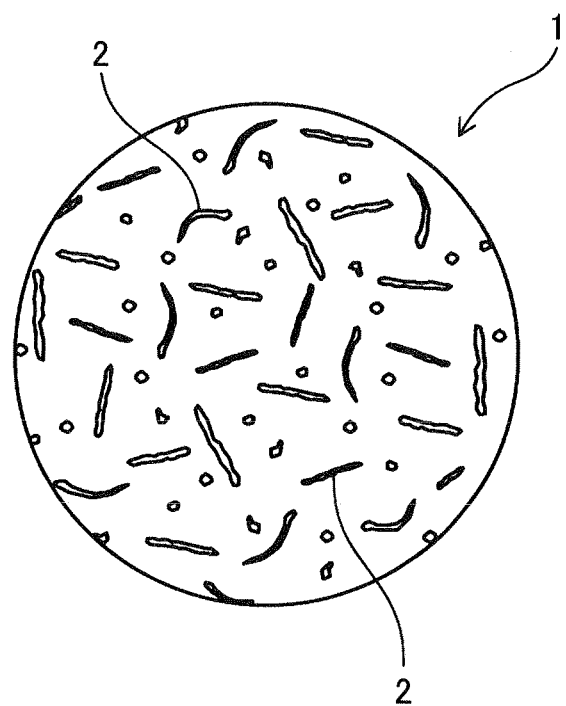
FIG. 2A is an explanatory diagram of an overall shape of the perovskite catalyst in a second example.

A perovskite catalyst and a method of manufacturing the perovskite catalyst according to an embodiment of the present invention will hereinafter be described with reference to examples.

[Method of Manufacturing Perovskite Catalyst]

The method of manufacturing the perovskite catalyst according to the embodiment of the present invention will be described.

First, a mixed powder is obtained by mixing an A-site material and a B-site material at a stoichiometric ratio such that the occupancy of the A-site becomes greater than the B-site, compared to that of a theoretical composition $ABO_3$ of perovskite oxide in which a ratio of A-site and B-site is 1:1 (mixing step).

Then, the obtained mixed powder is calcinated (calcinating step) and subsequently fired, thereby obtaining a fired powder containing perovskite oxide (firing step).

The fired powder is acid-treated with an acid having a pH level of 2 or more and less than 7, thereby obtaining a porous perovskite catalyst (acid-treating step).

Details of each process will hereinafter be described.

In the mixing step, the A-site material and the B-site material are mixed at a stoichiometric ratio such that the A-site is increased in number compared to the theoretical composition $ABO_3$ of the perovskite oxide. In other words, the A-site material and the B-site material are mixed at a stoichiometric ratio such that a ratio A/B of the A-site to the B-site of the perovskite oxide becomes greater than 1.

When the A-site material and the B-site material are mixed at a stoichiometric ratio of the theoretical composition of the perovskite oxide (in other words, when the ratio A/B of A-site to B-site is 1), or when mixed at a stoichiometric ratio such that A/B<1, sufficient porosity may not be achieved even when the acid-treating is performed. In addition, the perovskite structure may be destroyed by the acid-treating, and catalytic activity of the perovskite catalyst may decrease.

The A-site material and the B-site material are preferably mixed such that the ratio A/B of the A-site to the B-site of the perovskite oxide is from 1.5 to 10. A reason for this is that, when the ratio A/B becomes less than 1.5, the perovskite catalyst may not become sufficiently porous. On the other hand, when the ratio A/B exceeds 10, formation of heterogenous phase containing unreacted components may increase after the firing step, and the heterogenous phase to be removed by the acid-treating may increase. As a result, porous areas may decrease. The ratio A/B of the A-site to the B-site of the perovskite oxide is preferably 1.8 or more, and more preferably 2.5 or more.

As the A-site material, a material containing at least La and an alkaline earth element is preferably used. As the B-site material, a material containing at least one transition element selected from Co, Fe, and Mn is preferably used. As a result, the perovskite catalyst can be used to purify CO, $NO_X$, particulate matter (PM), and the like included in exhaust gas, as described hereinafter. A perovskite catalyst suitable for purifying exhaust gas can be achieved.

In the mixing step, water-soluble materials are preferably used as the A-site material and the B-site material. The mixed powder is preferably obtained by the A-site material and the B-site material being mixed in an aqueous medium. After mixing, the materials are evaporated to dryness. As a result, the A-site material and the B-site material can be mixed evenly, and a highly uniform mixed powder can be obtained. Therefore, in the firing step, the reactivity of the A-site material and the B-site material is enhanced, and yield of the perovskite oxide is increased.

As the water-soluble A-site material and B-site material, for example, metal salt may be used. Specifically, inorganic acid salt such as nitrate, sulfate, and chloride salt, or acetate, of each metal element in the A-site and the B-site of the perovskite oxide may be used.

In the aqueous medium, at least one type of organic acid selected from citric acid, malic acid, lactic acid, oxalic acid, succinic acid, and the like is preferably added. As a result, the organic acid within the aqueous medium forms a complex with each metal ion of the A-site material and the B-site material. Therefore, after evaporation to dryness in the mixing step, a mixed powder can be obtained in which each metal element of the A-site material and the B-site material is further evenly and uniformly mixed. As a result, yield of the perovskite oxide is further increased.

In the firing step, the mixed powder is fired at a firing temperature (such as 700° C. to 1000° C.) at which the desired perovskite oxide is formed.

In the calcinating step, the mixed powder is heated at, for example, 300° C. to 500° C. When the mixed powder is calcinated, acid, organic matter, and the like contained in the mixed powder can be removed before firing. Therefore, the calcinating step is preferably performed between the mixing step and the firing step.

Next, in the acid-treating step, the acid is set to pH 2 or more and lower than pH 7. When the acid is lower than pH 2, the overall grains of the fired powder may dissolve from the surface, and grain diameter may decrease without porosity being achieved. Therefore, catalytic activity may decrease. On the other hand, when the pH approaches 7, it takes a long time to achieve porosity and it is difficult to achieve sufficient porosity. In the acid-treating step, it is preferably to set pH 2.3 or more and 6 or lower, and more preferably pH 2.5 or more and 5 or lower.

The acid-treating is performed at, for example, 30° C. to 100° C. When the temperature exceeds 100° C., the acid evaporates, and it may become difficult to achieve porosity of the fired powder. On the other hand, when the temperature is less than 30° C., it may take a long time to achieve porosity of the fired powder. The temperature is more preferably 50° C. to 80° C.

In the acid-treating step, it is preferably to immerse the fired powder in an aqueous solution containing at least one of citric acid, malic acid, acetic acid, and oxalic acid. As a result, it becomes easier to achieve porosity of the fired powder, and to obtain a perovskite catalyst having a large specific surface area and a large pore volume.

[Perovskite Catalyst]

As described above, the perovskite catalyst composed of perovskite oxide manufactured using the method of manufacturing the perovskite catalyst has a large specific surface area and, furthermore, has a larger pore volume as a result of increased porosity. Therefore, catalytic sites do not decrease even when the perovskite catalyst is carried by a carrier, and excellent catalytic activity can be achieved.

The perovskite oxide preferably contains, for example, a rare earth element, such as La, and an alkaline-earth element at the A-site, and a transition element belonging to the fourth period of the periodic table of elements at the B-site. Furthermore, the perovskite oxide preferably contains at least La and an alkaline-earth element at the A-site, and at least one selected from Co, Fe, and Mn at the B-site. The perovskite oxide containing the foregoing elements can be used to purify Co, $NO_X$, particulate matter, and the like included in exhaust gas, and is suitable for purifying exhaust gas.

When the perovskite catalyst is used as an exhaust gas purifying catalyst, the perovskite catalyst is carried on, for example, a porous base material having a honeycomb structure.

The porous base material having a honeycomb structure has, for example, outer peripheral walls, porous partition walls provided in a polygonal lattice shape within the outer peripheral walls, and a plurality of cells partitioned by the porous partition walls. The cells partitioned by the porous partition walls form exhaust gas flow paths. Therefore, the exhaust gas purifying catalyst is configured by the perovskite catalyst being carried on the surfaces of the porous partition walls.

The perovskite catalyst according to the embodiment of the present invention is not limited to the exhaust gas purifying catalyst, and may be used as a photocatalyst or other types of catalyst.

The perovskite catalyst will be described in detail with reference to examples.

First Example

In a first example, the significance of combining materials at a certain stoichiometric ratio in the mixing step, firing the obtained mixed powder, and performing acid treatment will be discussed.

Specifically, first, $La(NO_3)_3.6H_2O$ and $Sr(NO_3)_2$ were prepared as the A-site material, and $Co(NO_3)_2.6H_2O$ was prepared as the B-site material. The A-site material and the B-site material were then added to 300 ml of distilled water at a stoichiometric ratio such that $La_{0.8}Sr_1CoO_3$ is formed after firing, described hereafter. Specifically, 92.35 g of $La(NO_3)_3.6H_2O$, 57.56 g of $Sr(NO_3)_2$, and 77.92 g of $Co(NO_3)_2.6H_2O$ were added. Furthermore, 112.51 g of citric acid mono-hydrate was added to the distilled water. The mixture was then stirred while being heated to a temperature of 150° C. by a hot plate stirrer. The A-site material, the B-site material, and the citric acid were thereby dissolved in the distilled water. Then, the mixture was heated for three to five hours at a temperature of 250° C. and evaporated to dryness, thereby obtaining the mixed powder (mixing step).

Next, the mixed powder was calcinated for two hours at a temperature of 400° C. (calcinating step), and then fired for five hours at a temperature of 800° C. (firing step). The fired powder was then ground by a high-speed vibration mill. The ground fired powder is sample P1.

Ten grams of the fired powder (sample P1) was added to an acetic acid aqueous solution (500 ml) having a concentration of 1.0 mol/L and a pH of 2.5. The mixture was stirred for an hour while being heated to a temperature of 70° C. by a hot plate stirrer, thereby being acid-treated (acid-treating step).

After acid treatment had been performed, the mixture was filtered and dried on a filter paper. The mixture was then heat-treated for five hours at a temperature that is the firing temperature or lower (700° C.), and the filter paper was burned. As a result, the perovskite catalyst was obtained. The resultant perovskite catalyst is sample E1.

Next, a perovskite catalyst (sample E2) was manufactured in a manner similar to that of sample E1, aside from the mixing ratio of the A-site material and the B-site material in the mixing being changed from that of sample E1.

In other words, to manufacture sample E2, first, the mixed powder was obtained by performing the mixing in a manner similar to that of sample E1, except that different amounts of the A-site material ($La(NO_3)_3.6H_2O$ and $Sr(NO_3)_2$), with the B-site material ($Co(NO_3)_2.6H_2O$) as before were added to distilled water at a stoichiometric ratio such that $La_{1.6}Sr_1CoO_3$ is formed after firing. Specifically, 184.70 g of $La(NO_3)_3.6H_2O$, 57.56 g of $Sr(NO_3)_2$, and 77.92 g of $Co(NO_3)_2.6H_2O$ were added. Then, the firing was performed and the fired powder was ground in a manner similar to that of sample E1. The fired powder obtained as described above is sample P2. The acid-treating was further performed in a manner similar to that of sample E1, thereby obtaining the perovskite catalyst (sample E2).

In addition, as a comparative example of sample E1 and sample E2, a perovskite catalyst (sample C) was manufactured that is composed of perovskite oxide having a theoretical composition such that the ratio of A-site and B-Site is 1:1. Sample C is a perovskite catalyst that has been manufactured without the acid-treating being performed.

In other words, to manufacture sample C, first, the mixed powder was obtained by performing the mixing in a manner similar to that of sample E1, except that this time the A-site material ($La(NO_3)_3.6H_2O$ and $Sr(NO_3)_2$) and the B-site material ($Co(NO_3)_2.6H_2O$) being added to distilled water at a stoichiometric ratio such that $La_{0.8}Sr_{0.2}CoO_3$ is formed after firing. Specifically, 92.35 g of $La(NO_3)_3.6H_2O$, 11.51 g of $Sr(NO_3)_2$, and 77.92 g of $Co(NO_3)_2.6H_2O$ were added. Then, the firing was performed and the fired powder was ground in a manner similar to that of sample E1, thereby obtaining the perovskite catalyst (sample C).

Next, X-ray diffraction (XRD) analysis was performed on the obtained sample P1, sample P2, sample E1, sample E2, and sample C.

XRD was performed using a powder X-ray diffraction apparatus ("RINT 2500/PC" manufactured by Rigaku Corporation). Measurement conditions were as follows: vacuum tube: Cu Kα line; tube voltage: 40 kV, tube current: 20 mA; divergence slit: 1/2°; scattering slit: 1/2°; receiving slit: 0.15 mm; scan mode: continuous; scan speed: 2.000°/min; sampling width: 0.020°; and scanning range: 10.000° to 80.000°. The results are shown in FIG. 1.

As shown in FIG. 1, in sample P1, sample P2, sample E1, sample E2, and sample C, peaks derived from perovskite oxide ($La_xSr_yCo_zO_3$) containing La and Sr at the A-site and Co at the B-site could be observed. In sample C, the peak derived from the perovskite oxide ($La_xSr_yCo_zO_3$) accounted for a majority of the peaks, and peaks derived from the heterogenous phase containing unreacted components could not be seen. In sample P1 and sample P2, large peaks derived from various metal oxides and metal complex oxides as heterogenous phase were found in addition to those derived from the perovskite oxide ($La_xSr_yCo_zO_3$). A reason for this is that, in the mixing step, the A-site material and the B-site material were mixed at a stoichiometric ratio such the A-site proportion becomes greater than the B-site, compared to that of the theoretical composition $ABO_3$ of the perovskite oxide. In sample E1 obtained by acid treatment being performed on sample P1 and sample E2 obtained by acid treatment being performed on sample P2, the peak intensity of the peaks derived from the heterogenous phase containing unreacted components decreased, and the peak intensity of the peaks derived from the perovskite oxide ($La_xSr_yCo_zO_3$) increased. A reason for this is thought to be that the heterogenous phase containing unreacted components was dissolved as a result of acid treatment.

In the first example, in the mixing step, the A-site material and the B-site material are mixed at a stoichiometric ratio such that the A-site increases, compared to that of the theoretical composition $ABO_3$ of the perovskite oxide in which the ratio of A-site and B-site becomes 1:1. The mixture is then fired. As a result, the heterogenous phase containing unreacted components is actively formed. Acid treatment is performed on the fired powder including the heterogenous phase, and the heterogenous phase within the fired powder can be dissolved. As a result, a porous perovskite catalyst can be obtained.

Second Example

In a second example, 39 types of perovskite catalysts (samples X1 to sample X39) were manufactured with varying types of B-site elements and A-site/B-site ratios for the mixing, and varying types of acid, pH levels, acid treatment temperatures, acid treatment durations, and the like for the acid-treating (see Table 1A, Table 1B, Table 2A and Table 2B).

Manufacturing of sample X1 will be described as a representative example.

First, in a manner similar to that in the first example, $La(NO_3)_3 \cdot 6H_2O$ and $Sr(NO_3)_2$ were prepared as the A-site material, and $Co(NO_3)_2 \cdot 6H_2O$ was prepared as the B-site material. The A-site material and the B-site material were then added to distilled water at a stoichiometric ratio such that $La_{0.8}Sr_{0.2}CoO_3$ is formed after firing, described hereafter. Specifically, the A-site material and the B-site material were added at a stoichiometric ratio such that the ratio of A-site/B-site becomes 1. Furthermore, in a manner similar to that in the first example, citric acid mono-hydrate was added to the distilled water. The mixture was then stirred while being heated to a temperature of 150° C. by a hot plate stirrer. The A-site material, the B-site material, and the citric acid were thereby dissolved in the distilled water. Then, the mixture was heated for three to five hours at a temperature of 250° C. and evaporated to dryness, thereby obtaining the mixed powder.

Next, in a manner similar to that in the first example, the mixed powder was calcinated for two hours at a temperature of 400° C. (calcinating step), and then fired for five hours at a temperature of 800° C. (firing step). The obtained fired powder was then ground. The fired powder was added to an acetic acid aqueous solution (500 ml) having a concentration of 1.0 mol/L and a pH level of 2.5. The mixture was stirred for five hours while being heated to a temperature of 70° C. by a hot plate stirrer, thereby being acid-treated.

In a manner similar to that in the first example, after acid treatment had been performed, the mixture was filtered and dried on a filter paper. The mixture was then heat-treated for five hours at a temperature that is the firing temperature or lower (700° C.), and the filter paper was burned. As a result, the perovskite catalyst was obtained. The resultant perovskite catalyst is sample X1.

Regarding samples X2 to X5, the perovskite catalysts were manufactured in a manner similar to that of sample X1, aside from the A-site material and the B-site material being added to the distilled water at stoichiometric ratios such that the ratio of A-site/B-site is the following values. Specifically, the ratio of A-site/B-site is 1.8 (stoichiometric ratio ($La_{0.8}SrCoO_3$)) in sample X2, 2.6 (stoichiometric ratio ($La_{1.6}SrCoO_3$)) in sample X3, 10 (stoichiometric ratio ($La_9SrCoO_3$)) in sample X4, and 15 (stoichiometric ratio ($La_{14}SrCoO_3$)) in sample X5.

Regarding sample X6, the perovskite catalyst was manufactured in a manner similar to that of sample X1, aside from using $Mn(NO_3)_2 \cdot 6H_2O$ as the B-site material.

Regarding samples X7 to X10, the perovskite catalysts were manufactured in a manner similar to that of sample X1, aside from using $Mn(NO_3)_2 \cdot 6H_2O$ as the B-site material, and the A-site material and the B-site material being added to the distilled water at stoichiometric ratios such that the ratio of A-site/B-site has the following values. Specifically, the ratio of A-site/B-site is 1.8 (stoichiometric ratio ($La_{0.8}SrMnO_3$)) in sample X7, 2.6 (stoichiometric ratio ($La_{1.6}SrMnO_3$)) in sample X8, 10 (stoichiometric ratio ($La_9SrMnO_3$)) in sample X9, and 15 (stoichiometric ratio ($La_{14}SrMnO_3$)) in sample X10.

Regarding sample X11, the perovskite catalyst was manufactured in a manner similar to that of sample X1, aside from using $Fe(NO_3)_2 \cdot 6H_2O$ as the B-site material.

Regarding samples X12 to X15, the perovskite catalysts were manufactured in a manner similar to that of sample X1, aside from using $Fe(NO_3)_2 \cdot 6H_2O$ as the B-site material, and the A-site material and the B-site material being added to the distilled water at stoichiometric ratios such that the ratio of A-site/B-site is the following values. Specifically, the ratio of A-site/B-site is 1.8 (stoichiometric ratio ($La_{0.8}SrFeO_3$)) in sample X12, 2.6 (stoichiometric ratio ($La_{1.6}SrFeO_3$)) in sample X13, 10 (stoichiometric ratio ($La_9SrFeO_3$)) in sample X14, and 15 (stoichiometric ratio ($La_{14}SrFeO_3$)) in sample X15.

Regarding samples X16 to X18, the perovskite catalysts were manufactured in a manner similar to that of sample X1, except for the following conditions.

$Co(NO_3)_2 \cdot 6H_2O$ in sample X16, $Mn(NO_3)_2 \cdot 6H_2O$ in sample X17 and $Fe(NO3)_2 \cdot 6H_2O$ in sample X18 were used as the B-site material. And the A-site material and the B-site material were added to the distilled water at stoichiometric ratios such that the ratio of A-site/B-site is 2.6. Specifically, the stoichiometric ratios are $La_{1.6}SrCoO_3$ in sample X16, $La_{1.6}SrMnO_3$ in sample X17 and $La_{1.6}SrFeO_3$ in sample X18.

Acid treatment was performed for ten hours at a temperature of 70° C., using an acetic acid aqueous solution having a concentration of 0.1 mol/L and a pH level of 4.

Regarding samples X19 to X21, the perovskite catalysts were manufactured in a manner similar to that of samples X16 to X18 described above, aside from acid treatment being performed for two hundred hours at a temperature of 70° C., using an acetic acid aqueous solution having a concentration of 0.0005 mol/L and a pH level of 6.5.

Regarding samples X22 to X24, the perovskite catalysts were manufactured in a manner similar to that of sample X1, except for the following conditions.

$Mn(NO_3)_2 \cdot 6H_2O$ in sample X23 and $Fe(NO_3)_2 \cdot 6H_2O$ in sample X24 were used as the B-site material. And the A-site material and the B-site material were added to the distilled water at stoichiometric ratios such that the ratio of A-site/B-site is 1.5. Specifically, the stoichiometric ratios are $La_{0.5}SrCoO_3$ in sample X22, $La_{0.5}SrMnO_3$ in sample X23 and $La_{0.5}SrFeO_3$ in sample X24.

Regarding samples X25 to X27, the perovskite catalysts were manufactured in a manner similar to that of samples X16 to X18, aside from acid treatment being performed for five hours at a temperature of 70° C., using a hydrochloric acid aqueous solution having a concentration of 1.0 mol/L and a pH level of 1.

Regarding samples X28 to X30, the perovskite catalysts were manufactured in a manner similar to that of samples X16 to X18, aside from acid treatment being performed for ten hours at a temperature of 70° C., using an acetic acid aqueous solution having a concentration of 1.0 mol/L and a pH level of 2.5.

Regarding samples X31 to X33, the perovskite catalysts were manufactured in a manner similar to that of samples X28 to X30, aside from acid treatment being performed for thirty hours.

Regarding samples X34 to X36, the perovskite catalysts were manufactured in a manner similar to that of samples X28 to X30, aside from acid treatment being not performed after the firing.

Regarding samples X37 to X39, the perovskite catalysts were manufactured in a manner similar to that of samples X28 to X30, aside from acid treatment being performed for one hundred hours.

The specific surface area and the pore volume were measured for the 39 types of perovskite catalysts manufactured as described above. An Autosorb-1 MP (manufactured by Yuasa Ionics Co., Ltd.) was used to measure the specific surface areas and pore volumes. The results are shown in Table 1A, Table 1B, Table 2A and Table 2B.

Purification performance regarding carbon monoxide (CO) was studied for sample X2, sample X3, sample X7, sample X8, sample X12, and sample X13. MEXA-1500D and SIGU-1000 manufactured by Horiba Ltd. was used to evaluate purification performance.

Specifically, each sample was carried by a monolithic carrier composed of cordierite (a porous base material having a honeycomb structure). Under a condition that the temperature of a built-in furnace of the apparatus is 25° C. to 600° C., CO gas was sent in from an inlet side. The amount of gas emitted from the outlet side and gas components were analyzed using a built-in gas analyzer. The temperature (purification temperature) at which 50% of the CO gas is purified was measured. The results are shown in Table 1A, Table 1B, Table 2A and Table 2B.

TABLE 1A

| Sample No. | B-site | Ratio (A-site/B-site) | Acid Types | pH | Acid Treatment Temperatures (° C.) | Durations (h) |
|---|---|---|---|---|---|---|
| X1 | Co | 1 | Acetic acid | 2.5 | 70 | 5 |
| X2 | | 1.8 | | | | |
| X3 | | 2.6 | | | | |
| X4 | | 10 | | | | |
| X5 | | 15 | | | | |
| X6 | Mn | 1 | | | | |
| X7 | | 1.8 | | | | |
| X8 | | 2.6 | | | | |
| X9 | | 10 | | | | |
| X10 | | 15 | | | | |
| X11 | Fe | 1 | | | | |
| X12 | | 1.8 | | | | |
| X13 | | 2.6 | | | | |
| X14 | | 10 | | | | |
| X15 | | 15 | | | | |
| X16 | Co | 2.6 | | 4.0 | | 10 |
| X17 | Mn | | | | | |
| X18 | Fe | | | | | |
| X19 | Co | | | 6.5 | | 200 |
| X20 | Mn | | | | | |
| X21 | Fe | | | | | |
| X22 | Co | 1.5 | | 2.5 | | 5 |
| X23 | Mn | | | | | |
| X24 | Fe | | | | | |

TABLE 1B

| Sample No. | Specific Surface Area (m²/g) | Pore Volume (cc/g) | T₅₀ (° C.) |
|---|---|---|---|
| X1 | 2.68 | 0.0854 | — |
| X2 | 3.70 | 0.1459 | 365 |
| X3 | 11.12 | 0.2532 | 328 |
| X4 | 26.00 | 0.3962 | — |
| X5 | 25.10 | 0.3569 | — |
| X6 | 3.49 | 0.0957 | — |
| X7 | 4.60 | 0.1538 | 403 |
| X8 | 10.30 | 0.2323 | 386 |
| X9 | 24.10 | 0.3575 | — |
| X10 | 24.50 | 0.3423 | — |
| X11 | 2.98 | 0.0642 | — |
| X12 | 4.50 | 0.1469 | 456 |
| X13 | 9.50 | 0.2336 | 436 |
| X14 | 22.10 | 0.3515 | — |
| X15 | 23.80 | 0.3392 | — |
| X16 | 15.39 | 0.2869 | — |
| X17 | 12.33 | 0.2754 | — |
| X18 | 13.65 | 0.2698 | — |
| X19 | 4.30 | 0.1536 | — |
| X20 | 5.10 | 0.1590 | — |
| X21 | 5.80 | 0.1647 | — |
| X22 | 5.69 | 0.1563 | — |
| X23 | 6.15 | 0.1483 | — |
| X24 | 4.97 | 0.1329 | — |

TABLE 2A

| Sample No. | B site | Ratio (A-site/B-site) | Acid Types | pH | Acid Treatment Temperatures (° C.) | Durations (h) |
|---|---|---|---|---|---|---|
| X25 | Co | 2.6 | Hydrochloric acid | 1 | 70 | 5 |
| X26 | Mn | | | | | |
| X27 | Fe | | | | | |
| X28 | Co | 2.6 | Acetic acid | 2.5 | | 10 |
| X29 | Mn | | | | | |
| X30 | Fe | | | | | |
| X31 | Co | | | | | 30 |
| X32 | Mn | | | | | |
| X33 | Fe | | | | | |
| X34 | Co | | — | — | — | 0 |
| X35 | Mn | | | | | |
| X36 | Fe | | | | | |
| X37 | Co | | Acetic acid | 2.5 | 70 | 100 |
| X38 | Mn | | | | | 100 |
| X39 | Fe | | | | | 100 |

TABLE 2B

| Sample No. | Specific Surface Area (m²/g) | Pore Volume (cc/g) |
|---|---|---|
| X25 | 1.22 | 0.03589 |
| X26 | 1.36 | 0.05428 |
| X27 | 1.06 | 0.04823 |
| X28 | 15.26 | 0.28390 |
| X29 | 13.68 | 0.29640 |
| X30 | 14.29 | 0.28760 |
| X31 | 16.23 | 0.32560 |
| X32 | 12.67 | 0.28640 |
| X33 | 15.61 | 0.29180 |
| X34 | 2.05 | 0.06980 |
| X35 | 1.69 | 0.06420 |
| X36 | 2.18 | 0.07580 |
| X37 | 15.34 | 0.31560 |
| X38 | 13.29 | 0.28950 |
| X39 | 15.27 | 0.28710 |

As shown in Table 1A, Table 1B, Table 2A and Table 2B, samples X2 to X5, samples X7 to X10, samples X12 to X24, samples X28 to X33, and samples X37 to X39 have been obtained by mixing the A-site material and the B-site material at the following stoichiometric ratio, and performing acid treatment using acid having a pH 2 or more and lower than 7 after firing. The stoichiometric ratio is value such that the A-site is greater than the B-site, compared to the theoretical composition $ABO_3$ of the perovskite oxide in which the ratio of A-site and B-site is 1:1. These samples have a large specific surface area and increased pore volume. Compared to samples X34 to X36 manufactured without acid treatment being performed, the foregoing samples clearly indicate increase in both specific surface area and pore volume.

Figure 2B:
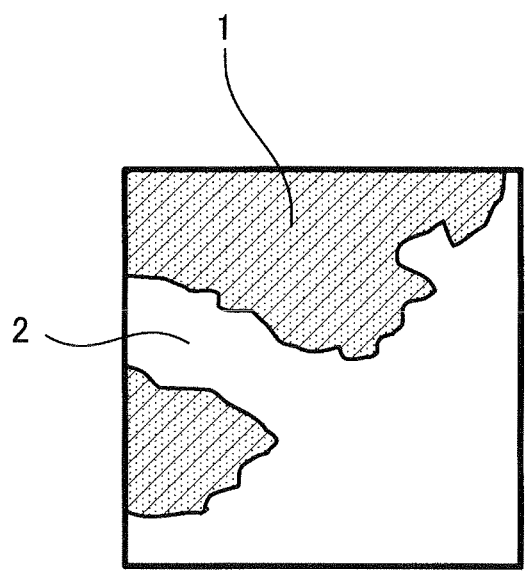
FIG. 2B is an explanatory diagram of an enlarged cross-sectional shape of a surface of the perovskite catalyst.

A reason for the increase in specific surface area and pore volume in samples X2 to X5, samples X7 to X10, samples X12 to X24, samples X28 to X33, and samples X37 to X39 is that the heterogenous phase containing unreacted components is dissolved and removed by acid treatment, and pores 2 are formed in the grains of the perovskite catalyst 1, as shown in FIG. 2A and FIG. 2B, thereby achieving porosity in the perovskite catalyst 1.

Furthermore, the perovskite oxide obtained as described above has been found to show sufficiently good purification performance regarding CO, as in sample X2, sample X3, sample X7, sample X8, sample X12, and sample X13 in Table 1A.

On the other hand, when the A-site material and the B-site material are mixed based on the theoretical composition of the perovskite oxide in which the ratio of A-site and B-site becomes 1:1, as in sample X1, sample X6, and sample X11, the specific surface area and pore volume become small. A reason for this is thought to be that the fired powder after firing has very little heterogenous phase containing unreacted components, and the heterogenous phase containing unreacted components is barely dissolved and removed even when acid treatment is performed.

In addition, when acid treatment is performed using hydrochloric acid of pH 1 as in samples X25 to X27, the specific surface area and pore volume become small, even compared to when acid treatment is not performed (samples X34 to X36). A reason for this is thought to be that the overall grains of the fired powder after firing are dissolved by acid treatment. Porosity cannot be achieved, and only the grain diameter decreases.

As describe above, in the second example, a perovskite catalyst having a large specific surface area, a large pore volume, and excellent catalytic activity can be manufactured by the A-site material and the B-site material being mixed at a stoichiometric ratio such that the A-site is greater than the B-site, compared to that of the theoretical composition $ABO_3$ in which the ratio of A-site and B-site is 1:1, and acid treatment being performed using acid of pH 2 or more and lower than pH 7 after firing.

What is claimed is:

1. A perovskite catalyst manufactured by a method of manufacturing a perovskite catalyst, the method comprising the steps of:
    first, mixing an A-site material and a B-site material at a stoichiometric ratio to obtain a mixed powder of A-site material and B-site material, the A-site being produced from A-site material, the B-site being produced from B-site material, the stoichiometric ratio being such that the A-site is greater than an A-site of a theoretical composition $ABO_3$ of perovskite oxide in which a ratio between A-site and B-site is 1:1;
    second, firing the obtained mixed powder to obtain a fired powder; and
    third, acid-treating the obtained fired powder with acid of pH 2 or more and less than pH 7.
2. The perovskite catalyst according to claim 1, wherein in the mixing step, the A-site material and the B-site material are mixed at the ratio A/B of the A-site to the B-site of the perovskite oxide, the ratio A/B being from 1.5 to 10.
3. The perovskite catalyst according to claim 1, wherein the A-site material contains at least La and an alkaline earth element, and the B-site material contains at least one transition element selected from Co, Fe, and Mn.
4. The perovskite catalyst according to claim 1, wherein in the mixing step, the A-site material and the B-site material are mixed in an aqueous medium, using water-soluble materials as the A-site material and the B-site material.
5. The perovskite catalyst according to claim 1, wherein in the acid-treating step, the fired powder is immersed in an aqueous solution containing at least one of citric acid, malic acid, acetic acid, and oxalic acid.
6. The perovskite catalyst according to claim 1, wherein the perovskite catalyst carried on a base material is used as an exhaust gas purifying catalyst.

* * * * *